(12) United States Patent
Fletcher et al.

(10) Patent No.: US 10,379,992 B2
(45) Date of Patent: Aug. 13, 2019

(54) ADAPTIVE DYNAMIC CODE ANALYSIS

(71) Applicant: INTERNATIONAL BUSINESS MACHINES CORPORATION, Armonk, NY (US)

(72) Inventors: Owen Fletcher, Dublin (IE); Miguel Jimenez Monasor, Dublin (IE); Mihaela Miches, Dublin (IE); Jose C. Raya de la Torre, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 21 days.

(21) Appl. No.: 15/333,784

(22) Filed: Oct. 25, 2016

(65) Prior Publication Data

US 2018/0113801 A1    Apr. 26, 2018

(51) Int. Cl.
  *G06F 11/00*   (2006.01)
  *G06F 11/36*   (2006.01)
  *G06F 8/33*    (2018.01)
  *G06F 8/60*    (2018.01)
  *G06F 8/75*    (2018.01)

(52) U.S. Cl.
  CPC ............ *G06F 11/3604* (2013.01); *G06F 8/60* (2013.01); *G06F 11/00* (2013.01); *G06F 11/36* (2013.01); *G06F 11/362* (2013.01); *G06F 11/3624* (2013.01); *G06F 11/3692* (2013.01); *G06F 8/33* (2013.01); *G06F 8/75* (2013.01)

(58) Field of Classification Search
  None
  See application file for complete search history.

(56) References Cited

U.S. PATENT DOCUMENTS 7,168,009 B2  1/2007  Darringer et al.
7,392,545 B1  6/2008  Weber et al.
7,716,649 B2  5/2010  Clemm et al.
(Continued)

OTHER PUBLICATIONS

Ilene Burnstein, "Practical Software Testing", Springer Professional Computing, 2003, p. 1-732.
(Continued)

*Primary Examiner* — Francisco J Aponte
*Assistant Examiner* — Mark A Gooray
(74) *Attorney, Agent, or Firm* — Cantor Colburn LLP; Richard Wilhelm (57) ABSTRACT

An example method may include classifying a plurality of atomic pieces of historic feedback to create an association between the plurality of atomic pieces of historic feedback and a plurality of atomic pieces of historic code associated with the plurality of atomic pieces of historic feedback; storing the plurality of atomic pieces of historic feedback and the plurality of atomic pieces of historic code to a data store; comparing the plurality of atomic pieces of historic feedback to group similar kinds of feedback; receiving a request for code review of new code; comparing the new code to the plurality of atomic pieces of historic code to measure similarities between the new code and the plurality of pieces of historic code to identify similar code from the plurality of atomic pieces of historic code; and providing feedback on the new code based on feedback associated with the similar code.

17 Claims, 5 Drawing Sheets

(56) References Cited

U.S. PATENT DOCUMENTS

| | | | |
|---|---|---|---|
| 8,806,441 B2* | 8/2014 | Chandra | G06F 8/75 717/126 |
| 9,201,646 B2 | 12/2015 | Balachandran | |
| 9,262,134 B2 | 2/2016 | Kelapure et al. | |
| 9,286,063 B2 | 3/2016 | Kriegsman et al. | |
| 2005/0015752 A1 | 1/2005 | Alpern et al. | |
| 2011/0321007 A1* | 12/2011 | Marum | G06F 8/65 717/113 |
| 2014/0053135 A1 | 2/2014 | Bird et al. | |
| 2015/0082277 A1* | 3/2015 | Champlin-Scharff | G06F 15/18 717/120 |

OTHER PUBLICATIONS

Ira D. Baxter, et al.,"Clone Detection Using Abstract Syntax Trees", IEEE, Proceedings of ICSM, Nov. 16-19, 1998, p. 1-11.

Lulian Neamtiu, et al.,"Understanding Source Code Evolution Using Abstract Syntax Tree Matching", MSR, May 17, 2005, p. 1-5.

Matthias Rieger, et al., "Visual Detection of Duplicated Code", Proceedings ECOOP Workshop on Experiences in Object-Oriented Re-Engineering, 1998, p. 1-6.

Sebastien Harispe, et al.,"Semantic Similarity from Natural Language and Ontology Analysis" ResearchGate, May 25, 2016, p. 1-8.

Yuhua Li, et al.,"Sentence Similarity Based on Semantic Nets and Corpus Statistics", IEEE Transactions on Knowledge and Data Engineering, vol. 18, No. 8, Aug. 2006, p. 1-13.

* cited by examiner

ADAPTIVE DYNAMIC CODE ANALYSIS

BACKGROUND

The present disclosure generally relates to software development and, more particularly, relates to adaptive dynamic code analysis using historical data.

Code analysis and defect prevention are useful activities in any software project. The purpose of defect prevention is to identify the cause of defects and prevent them from recurring. Defect prevention involves analyzing defects that were encountered in the past and taking specific actions to prevent the occurrence of those types of defects in the future.

Currently, static code analyzers are used to provide a minimum quality of the code delivered based on predefined rules. Those rules force the developer to follow a coding standard and prevent basic errors. On the other hand, manual code reviews are also useful to prevent potential defects that a software developer could detect before the delivery of the change set. Manual code reviews are helpful for detecting points of improvement in terms or quality, performance, and security.

In some cases, similar software defects may be repeated across different development projects by different software developers. Even the same software engineer could repeat the same type of defect over time. Since code reviews are currently conducted by other software developers as reviewers, the reviewers may also inadvertently miss potential defects or opportunities to improve the quality of the code. Also, the feedback that the reviewers provide depends on the individual knowledge and experience of each reviewer. Moreover, different reviewers have different styles and focus on different aspects of the code quality.

SUMMARY

According to aspects of the present disclosure, techniques including methods, systems, and/or computer program products for adaptive dynamic code analysis using historical data are provided. An example method may include classifying, by a processor, a plurality of atomic pieces of historic feedback to create an association between the plurality of atomic pieces of historic feedback and a plurality of atomic pieces of historic code associated with the plurality of atomic pieces of historic feedback. The method may further include storing, by the processor, the plurality of atomic pieces of historic feedback and the plurality of atomic pieces of historic code to a data store. The method may further include comparing, by the processor, the plurality of atomic pieces of historic feedback to group similar kinds of feedback. The method may further include receiving, by the processor, a request for code review of new code. The method may further include comparing, by the processor, the new code to the plurality of atomic pieces of historic code to measure similarities between the new code and the plurality of pieces of historic code to identify similar code from the plurality of atomic pieces of historic code. The method may further include providing, by the processor, feedback on the new code based on feedback associated with the similar code.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Various implementations are described below by referring to several examples of adaptive dynamic code analysis using historical data. The present disclosure presents an automatic method for detecting code improvements based on historical improvements. Currently, when a defect is fixed, it is possible to compare the change set that solved an issue with the change set previous to that improvement. In a similar way, when a human code reviewer provides feedback, it is also possible to trace the changes in the code which addressed that feedback. Based on that historical data, the techniques presented herein automatically provide suggestions for improving a new changeset based on historical improvements on code similar to the one that is being analyzed.

Typically code reviews are manually conducted by an experienced software developer (the reviewer) with knowledge in the appropriate area as follows. A software developer sends a code review to the reviewer. This code review is a changeset with new version of files affected by the change and a link to the related workitem which describes the issue that is being fixed. Next, the reviewer inspects the changeset and the workitem in order to provide feedback. This feedback is usually tracked through the workitem. Finally, the software developer implements changes according to the comments from the reviewer and then delivers or sends a new code review with the new version. This process may continue to iterate through multiple reviews and revisions.

The present techniques take advantage of the information generated during this process to automate future code reviews. To do so, the present techniques compare the initial version of a changeset with the improved version after addressing the comments provided by the reviewer.

The reviews are classified according to the nature of the changes. To do so, the natural language in which the comments are expressed is analyzed. Moreover, the nature of the improvement is also determined by analyzing the initial and final version of the change sets. Based on both measures, the reviews are clustered in order to be used in future reviews.

A database is, therefore, populated containing natural language comments linked to code changes (initial and final versions). The database grows over the time containing valuable information about the specifics of the project.

The system of the present techniques makes use of this information in order to automatically analyze code before the code is delivered or sent for a manual code review. The dynamic code analyzer is able to review code changes introduced and compare them with previous code changes that were corrected in the past. If the analyzer is able to detect any potential improvement, it provides a comment in natural language to the software developer similar to the comment that is contained in the database for a previous review that matches with the current one.

The system of the present techniques learns from the code review process and follow-up commits, but also from the actions of the software developer. For example, if the software developer decides to ignore or fix a specific warning, the system takes that into account. As the codebase grows, the system knows more about the specifics and is able to suggest improvements with a higher accuracy.

Example embodiments of the disclosure include or yield various technical features, technical effects, and/or improvements to technology. Example embodiments of the disclosure provide an adaptive dynamic code analysis system using historical data configured to automatically provide automatic feedback, based on the historical data, on a changeset to a developer. In particular, the present techniques provide for classifying a plurality of atomic pieces of historic feedback to create an association between the plurality of atomic pieces of historic feedback and a plurality of pieces of historic code associated with the plurality of atomic pieces of historic feedback; storing the plurality of atomic pieces of historic feedback and the plurality of pieces of historic code to a data store; comparing the plurality of atomic pieces of historic feedback to group similar kinds of feedback; receiving a request for code review of new code; and comparing the new code to the plurality of atomic pieces of historic code to measure similarities between the new code and the plurality of pieces of historic code to identify similar code from the plurality of pieces of historic code.

These aspects of the disclosure constitute technical features that yield the technical effect of providing feedback on the new code based on feedback associated with the similar code without requiring manual review. As a result of these technical features and technical effects, an adaptive dynamic code analysis system in accordance with example embodiments of the disclosure represents an improvement to existing code analysis techniques. In particular, the use of historic feedback provides high quality, relevant to a developer without the need for manual review. This prevents a developer from making errors made by other developers (or by himself previously) by alerting the developer to such errors. The present techniques also improve the quality of code by detecting errors that may be missed during the manual review and provide consistency by catching the same errors each time. It can also suggest the use of a common coding style, as well as providing suggestions to improve performance, security or usability based on previous feedback. It should be appreciated that the above examples of technical features, technical effects, and improvements to technology of example embodiments of the disclosure are merely illustrative and not exhaustive.

Figure 1A:
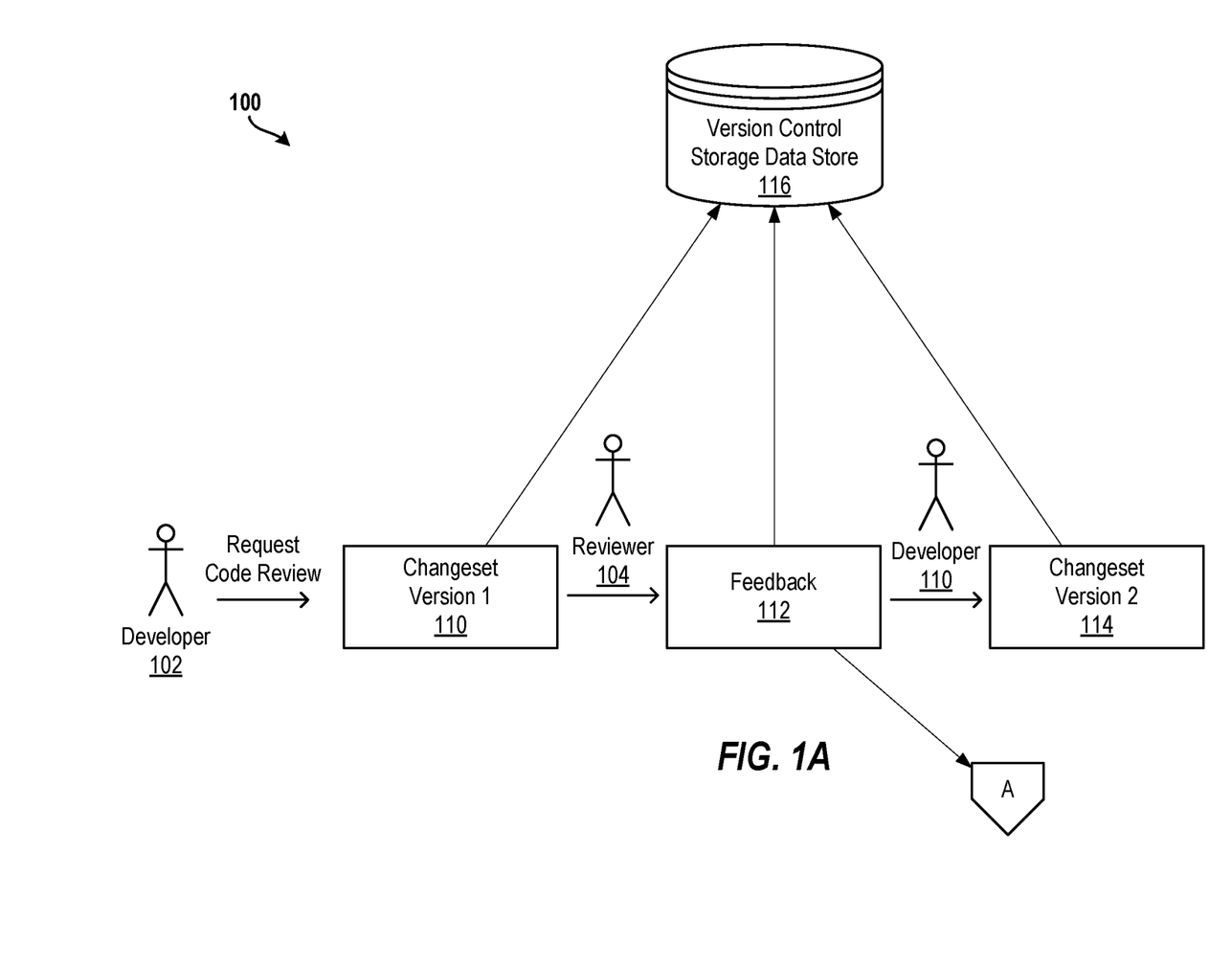
FIG. 1A illustrates a block diagram of a manual code review according to aspects of the present disclosure.

FIG. 1A illustrates a block diagram of a manual code review 100 according to aspects of the present disclosure. A developer 102 (i.e., a software developer) creates a first version of a changeset (e.g., changeset version 1 110) that is reviewed by a reviewer 104. The reviewer 104 provides feedback 112 (i.e., workitem comments) to the developer 102. The developer 102 then creates a second version of a changeset (e.g., changeset version 2 114) addressing and/or incorporating the feedback provided by the reviewer 104. Both the feedback 112 and the changesets 110, 114 are stored in a data store such as the version control storage data store 116.

Figure 1B:
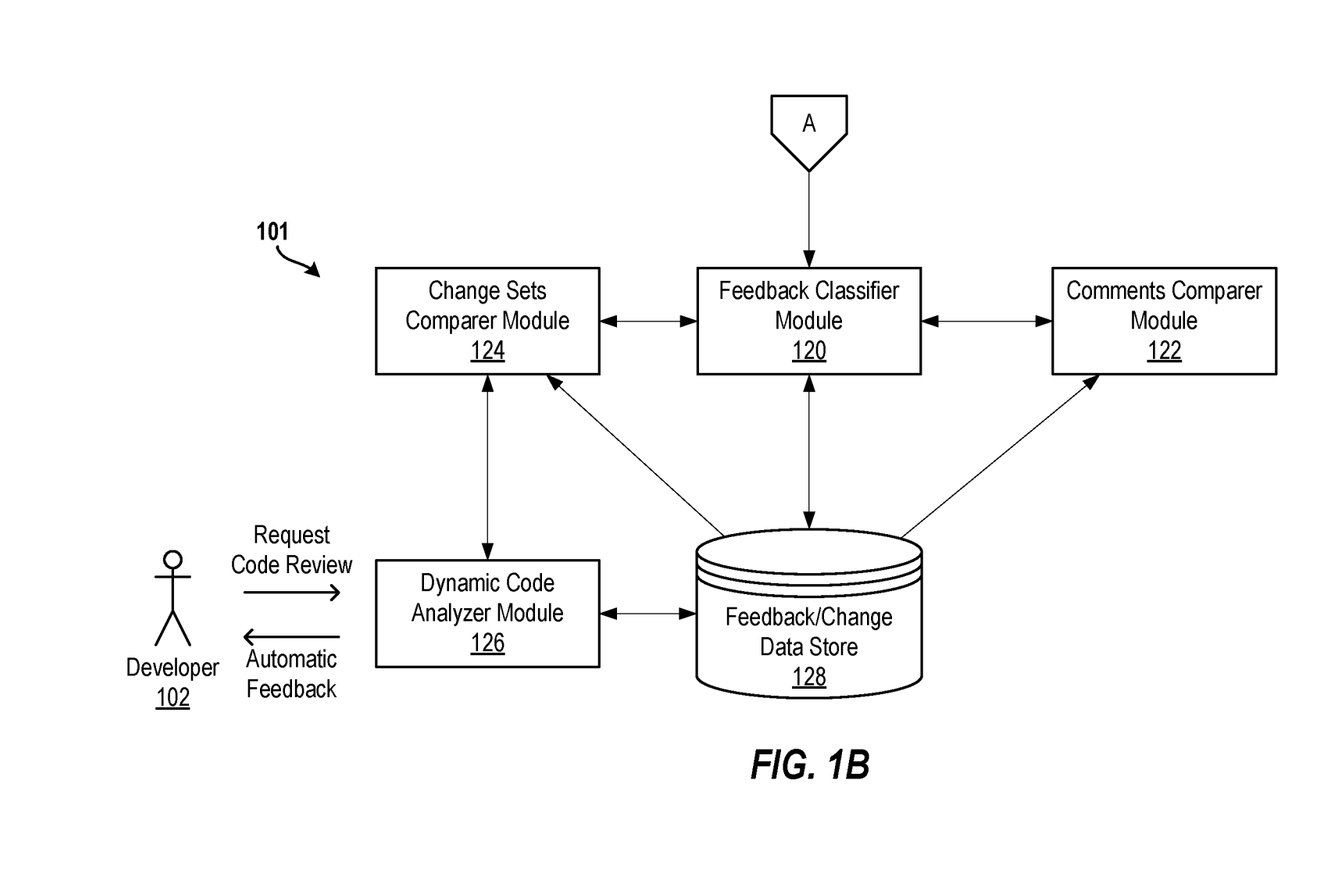
FIG. 1B illustrates a block diagram of an adaptive dynamic code analysis using historical data according to aspects of the present disclosure.

FIG. 1B illustrates a block diagram of an adaptive dynamic code analysis 101 using historical data according to aspects of the present disclosure. In particular, the adaptive dynamic code analysis 101 makes use of the information generated through the manual code review 100 of FIG. 1A in order to automatically provide automatic feedback on a changeset to the developer 102. This feedback is based on previous comments for similar changesets that were generated in the past, such as the feedback 112 of FIG. 1A. The components utilized to perform the adaptive dynamic code analysis 101 include a feedback classifier module 120, a comments comparer module 122, a change sets comparer module 124, a dynamic code analyzer module 126, and a feedback/change data store 128. These components are described in further detail with respect to processing system 200 of FIG. 2.

Generally, the feedback classifier module 120 receives feedback 112 from the reviewer 104 and stores the feedback 112 to the feedback/change data store 128. The comments comparer module 122 is used to group similar types of feedback by using natural language processing (NLP) techniques. When the developer 102 sends a request for code analysis, the dynamic code analyzer module 126 receives the request as an original changeset. The dynamic code analyzer module 126 uses the change sets comparer module 124 to determine which previous changesets (stored in the feedback/change data store 128) are related to the original changeset. The dynamic code analyzer module 126 then outputs feedback based on previous knowledge derived from the manual code review 100 to the developer 102.

Figure 2:
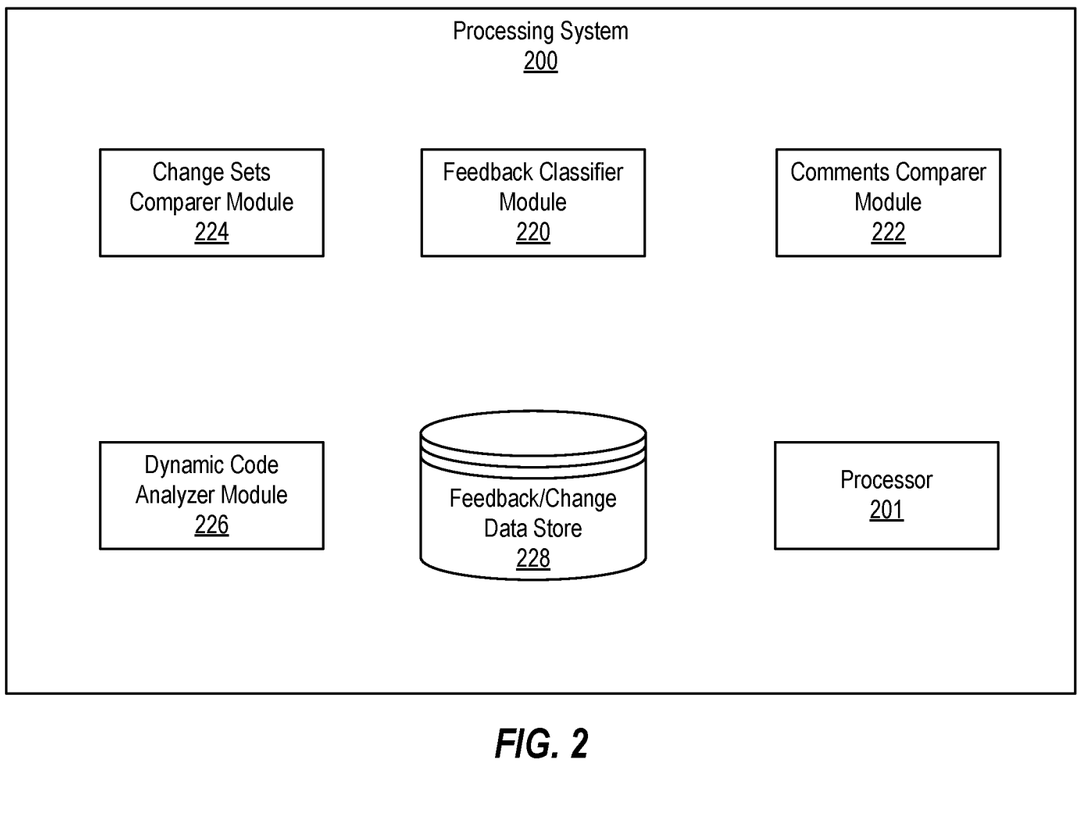
FIG. 2 illustrates a block diagram of a processing system for adaptive dynamic code analysis using historical data according to aspects of the present disclosure.

In particular, FIG. 2 illustrates a block diagram of a processing system 200 for adaptive dynamic code analysis using historical data according to aspects of the present disclosure. The various components, modules, engines, etc. described regarding FIG. 2 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processor 201 for executing those instructions. Thus a system memory can store program instructions that when executed by the processor 201 implement the engines described herein. Other engines may also be utilized to include other features and functionality described in other examples herein.

Processing system 200 may include the processor 201, a feedback classifier module 220, a comments comparer module 222, a change sets comparer module 224, a dynamic code analyzer module 226, and a feedback/change data store 228. Alternatively or additionally, the processing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Feedback is usually expressed in a vague way. For example, feedback can be very generic and can also refer to multiple changes rather than a small and localized change. Therefore, it is useful to reduce the feedback into small chunks regarding a specific improvement in the code. In order to establish a link between an atomic piece of feedback and a piece of code the feedback classifier module 220 may enable a developer to establish the association or may automatically create the association.

In one example, the feedback classifier module 220 enables the developer to establish the relation between the atomic pieces of feedback and the pieces of code in the changeset that refer to that atomic feedback. In another example, the feedback classifier module 220 creates the associations automatically. To create the associations automatically, the feedback classifier module 220 utilizes the comments comparer module 222 and the change sets comparer module 224. It is possible to determine whether the feedback refers to one or more improvements by applying Natural Language Processing (NLP) techniques using the comments comparer module 222. In case there is only one improvement, the association can be established automatically. It is also possible to determine how close a change is to a previous change by comparing the nature of the changes using the change sets comparer module 224.

In this way, the feedback classifier module 220 stores the association between the new feedback and changes in the feedback/change data store 228 for being used in future code analysis. The feedback classifier module 220 takes as input comments of a review and the related changes and outputs atomic feedback classified and related to the specific changes addressed.

The comments comparer module 222 groups similar kinds of feedback by using NPL techniques. In most cases, feedback is expressed in natural language. Natural language feedback makes it difficult to classify the different kinds of feedback, since the same main point of the feedback can be expressed in many different ways. Feedback is expressed mixing different topics, so it is useful to organize and classify the feedback based on NPL techniques. The comments comparer module 222 takes an input feedback from a code review expressed in natural language and contained in the feedback/change data store 228 and provides as output feedback simplified and classified according to previous feedback contained in the feedback/change data store 228.

In order to detect whether a piece of code is similar to a previous code, it should be considered that the code may not be exactly similar. In many cases, different variable names may be used, the code may be arranged in a different way, or the functionality of that part of the code may be slightly different to a similar change stored in the system.

In order to address this, the change sets comparer module 224 measures similarity between two pieces of code. A number of different algorithms have been proposed to detect duplicate code (e.g., Baker's algorithm, Rabin-Karp string search algorithm, Abstract Syntax Trees, and/or Visual clone detection)

Given a new piece of code that needs to be automatically reviewed, the change sets comparer module 224 checks if there was a similar changeset already delivered and improved through a second code review. The similar pieces of code are ranked according to their similarity. The Change sets comparer module 224 takes as input a new changeset that needs to be reviewed and outputs a list of similar changesets that received feedback in the past sorted by their similarity with the current changeset.

When the developer submits a new changeset, the dynamic code analyzer module 226 uses the change sets comparer module 224 to determine which previous changesets are related to the current one. Once this information is retrieved, the dynamic code analyzer module 226 presents feedback to the developer on how to improve the changeset based on previous feedback for similar changesets. The feedback may be sorted considering a distance between the code and the priority or relevance of the feedback stored in feedback/change data store 228.

In examples, the dynamic code analyzer 226 tracks the actions of the developer in order to learn from the developer's actions. In cases for which the developer does not address the issue, the processing system 200 may decrease the priority of this feedback for future occurrences. In cases for which the developer addresses the issue in a similar way as it was previously done, the processing system 200 may increase the priority of this feedback for being considered in the future. In cases for which the developer addresses the issue in a different way that is not contained in the feedback/change data store 228, a new entry is stored with the new case in the feedback/change data store 228.

The dynamic code analyzer 226 takes as input an original changeset and provides as output feedback based on previous knowledge.

The feedback/change data store 228 stores information such as feedback classified by metadata depending on the topics treated and linked to related feedback/changes. In examples, the feedback/change data store 228 stores one or more of the following: an initial version of a change; a final version of the change; atomic comments provided by a reviewer; a priority/relevance of the feedback; and metadata for classification/clustering.

Figure 3:
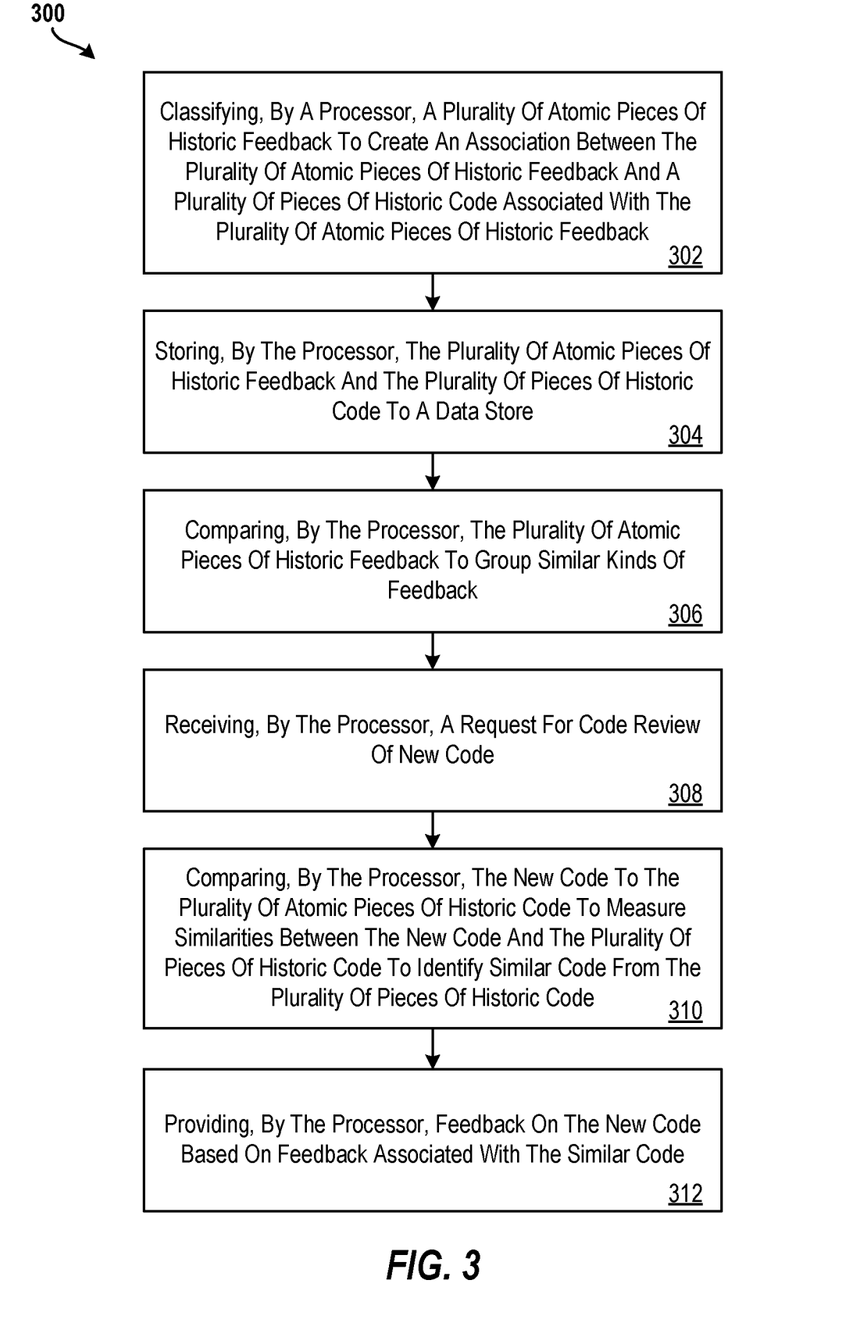
FIG. 3 illustrates a flow diagram of a method for adaptive dynamic code analysis using historical data according to aspects of the present disclosure.

FIG. 3 illustrates a flow diagram of a method 300 for an adaptive dynamic code analysis using historical data according to aspects of the present disclosure. The method 300 may be performed by the processing system 200 of FIG. 2, by the processing system 20 of FIG. 4, or by another suitable processing system.

At block 302, the method 300 includes classifying, by a processor, a plurality of atomic pieces of historic feedback to create an association between the plurality of atomic pieces of historic feedback and a plurality of pieces of historic code associated with the plurality of atomic pieces of historic feedback. At block 304, the method 300 includes storing, by the processor, the plurality of atomic pieces of historic feedback and the plurality of pieces of historic code to a data store.

At block 306, the method 300 includes comparing, by the processor, the plurality of atomic pieces of historic feedback to group similar kinds of feedback. At block 308, the method 300 includes receiving, by the processor, a request for code review of new code.

At block 310, the method 300 includes comparing, by the processor, the new code to the plurality of atomic pieces of historic code to measure similarities between the new code and the plurality of pieces of historic code to identify similar code from the plurality of pieces of historic code. At block 312, the method 300 includes providing, by the processor, feedback on the new code based on feedback associated with the similar code.

Additional processes also may be included, and it should be understood that the processes depicted in FIG. 3 represent illustrations, and that other processes may be added or existing processes may be removed, modified, or rearranged without departing from the scope and spirit of the present disclosure.

Figure 4:
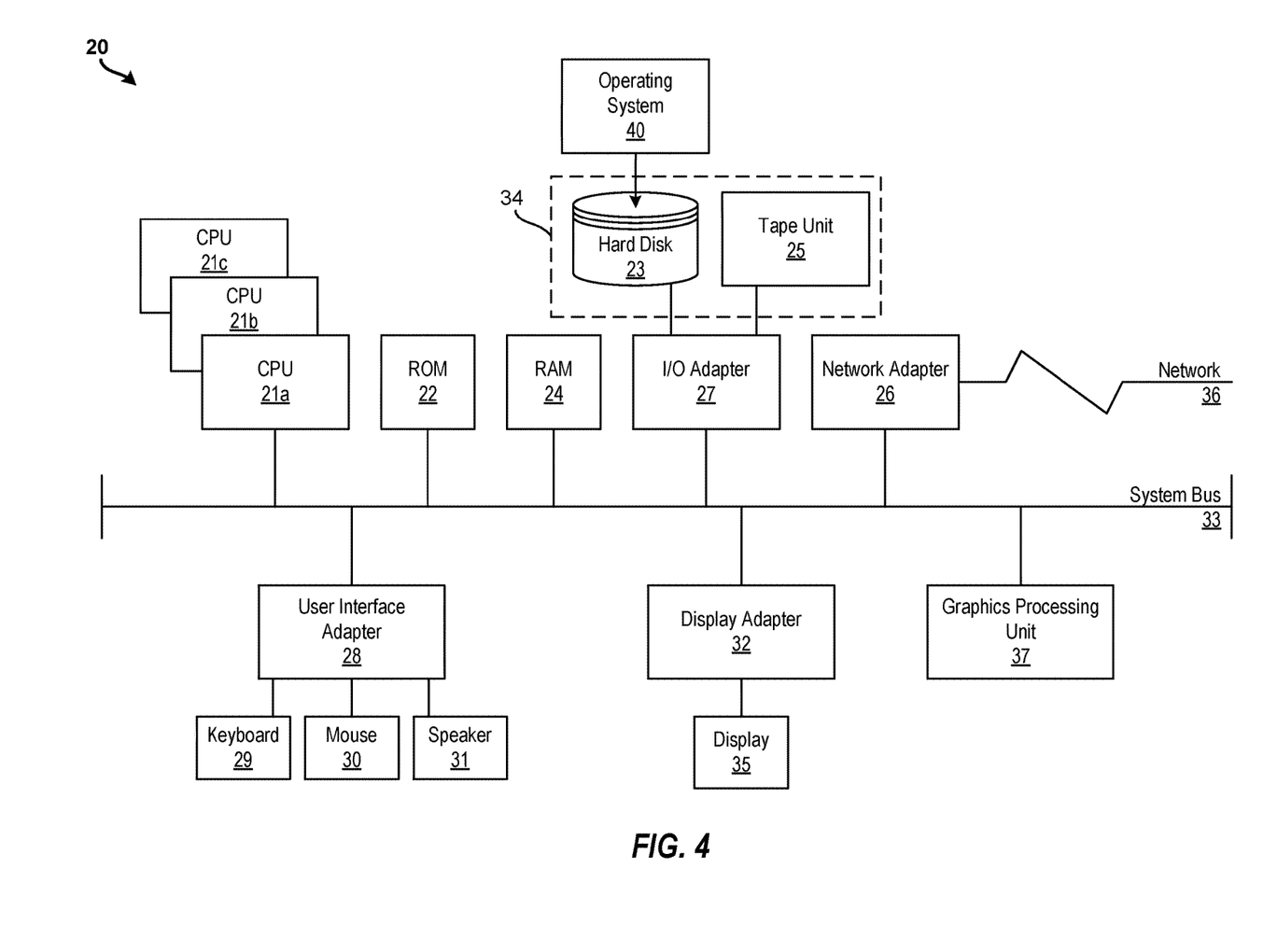
FIG. 4 illustrates a block diagram of a processing system for implementing the techniques described herein according to aspects of the present disclosure.

It is understood in advance that the present disclosure is capable of being implemented in conjunction with any other type of computing environment now known or later developed. For example, FIG. 4 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for an adaptive dynamic code analysis using historical data, the method comprising:
   classifying, by a processor, a plurality of historic feedback into a plurality of atomic pieces of historic feedback to create an association between the plurality of atomic pieces of historic feedback and a plurality of atomic pieces of historic code wherein the feedback comprise a plurality of comments related to one or more code improvements, and wherein each comment is written by a respective software code reviewer and is expressed in natural language, by performing the steps of:
   determining whether each feedback refers to one or more code improvements, reducing the feedback to an atomic piece of historic feedback for each respective improvement, grouping similar kinds of atomic pieces of feedback and associating one or more atomic pieces of feedback with its related atomic pieces of historic code;
   storing, by the processor, the plurality of atomic pieces of historic feedback and the plurality of atomic pieces of historic code to a data store;
   receiving, by the processor, a request for code review of new code;
   comparing, by the processor, the new code to the plurality of atomic pieces of historic code to measure similarities between the new code and the plurality of atomic pieces of historic code to identify each atomic piece of historic code that is similar to the new code, wherein each similar atomic piece of historic code are ranked according to similarity to the new code;
   providing, by the processor, feedback on the new code based on atomic pieces of feedback associated with the similar atomic pieces of historic code and sorting the feedback based upon the ranked similarity and a priority of the feedback; and
   tracking actions of a developer, learning from actions of the developer, and increasing or decreasing the priority of the feedback associated with the similar code for being considered in the future based on an action of the developer, wherein the priority of the feedback is increased when the action of the developer is to address an issue in a similar way as it was previously addressed, and wherein the priority of the feedback is decreased when the action of the developer is not to address the issue.

2. The computer-implemented method of claim 1, wherein comparing the plurality of atomic pieces of historic feedback to group similar kinds of feedback further comprises using a natural language processing (NLP) technique to compare the plurality of atomic pieces of historic feedback to group similar kinds of feedback.

3. The computer-implemented method of claim 1, wherein providing the feedback on the new code further comprises sorting the feedback on the new code based on a distance between the code and a relevance of the feedback stored in the data store.

4. The computer-implemented method of claim 1, wherein the feedback on the new code instructs a developer how to improve the code based on previous feedback for similar code.

5. The computer-implemented method of claim 1, wherein the data store stores one or more of the following: an initial version of a change, a final version of the change, atomic comments provided by a reviewer, a priority of the feedback, a relevance of the feedback, and metadata for classification.

6. The computer-implemented method of claim 1, further comprising:
- receiving, by the processor, a second request for code review of second new code;
- comparing, by the processor, the second new code to the plurality of atomic pieces of historic code to measure similarities between the new code and the plurality of pieces of historic code to identify similar code from the plurality of atomic pieces of historic code; and
- providing, by the processor, feedback on the second new code based on feedback associated with the similar code.

7. A system for adaptive dynamic code analysis using historical data, the system comprising:
- a memory comprising computer readable instructions; and
- a processor for executing the computer readable instructions, the computer readable instructions performing a method comprising:
- classifying, by a processor, a plurality of historic feedback into a plurality of atomic pieces of historic feedback to create an association between the plurality of atomic pieces of historic feedback and a plurality of atomic pieces of historic code wherein the feedback comprise a plurality of comments related to one or more code improvements, and wherein each comment is written by a respective software code reviewer and is expressed in natural language, by performing the steps of:
- determining whether each feedback refers to one or more code improvements, reducing the feedback to an atomic piece of historic feedback for each respective improvement, grouping similar kinds of atomic pieces of feedback and associating one or more atomic pieces of feedback with its related atomic pieces of historic code;
- storing, by the processor, the plurality of atomic pieces of historic feedback and the plurality of atomic pieces of historic code to a data store;
- receiving, by the processor, a request for code review of new code;
- comparing, by the processor, the new code to the plurality of atomic pieces of historic code to measure similarities between the new code and the plurality of atomic pieces of historic code to identify each atomic pieces of historic code that is similar to the new code, wherein each similar atomic piece of historic code are ranked according to similarity to the new code;
- providing, by the processor, feedback on the new code based on atomic pieces of feedback associated with the similar atomic pieces of historic code and sorting the feedback based upon the ranked similarity and a priority of the feedback; and
- tracking actions of a developer, learning from actions of the developer, and increasing or decreasing the priority of the feedback associated with the similar code for being considered in the future based on what action the developer implemented, wherein the priority of the feedback is increased when the action of the developer is to address an issue in a similar way as it was previously addressed, and wherein the priority of the feedback is decreased when the action of the developer is not to address the issue.

8. The system of claim 7, wherein comparing the plurality of atomic pieces of historic feedback to group similar kinds of feedback further comprises using a natural language processing (NLP) technique to compare the plurality of atomic pieces of historic feedback to group similar kinds of feedback.

9. The system of claim 7, wherein providing the feedback on the new code further comprises sorting the feedback on the new code based on a distance between the code and a relevance of the feedback stored in the data store.

10. The system of claim 7, wherein the feedback on the new code instructs a developer how to improve the code based on previous feedback for similar code.

11. The system of claim 7, wherein the data store stores one or more of the following: an initial version of a change, a final version of the change, atomic comments provided by a reviewer, a priority of the feedback, a relevance of the feedback, and metadata for classification.

12. The system of claim 7, the method further comprising:
- receiving, by the processor, a second request for code review of second new code;
- comparing, by the processor, the second new code to the plurality of atomic pieces of historic code to measure similarities between the new code and the plurality of pieces of historic code to identify similar code from the plurality of atomic pieces of historic code; and
- providing, by the processor, feedback on the second new code based on feedback associated with the similar code.

13. A computer program product for adaptive dynamic code analysis using historical data, the computer program product comprising:
- a computer readable storage medium having program instructions embodied therewith, wherein the computer readable storage medium is not a transitory signal per se, the program instructions executable by a processing device to cause the processing device to perform a method comprising:
- classifying, by a processor, a plurality of historic feedback into a plurality of atomic pieces of historic feedback to create an association between the plurality of atomic pieces of historic feedback and a plurality of atomic pieces of historic code wherein the feedback comprise a plurality of comments related to one or more code improvements, and wherein each comment is written by a respective software code reviewer and is expressed in natural language, by performing the steps of:
- determining whether each feedback refers to one or more code improvements, reducing the feedback to an atomic piece of historic feedback for each respective improvement, grouping similar kinds of atomic pieces of feedback and associating one or more atomic pieces of feedback with its related atomic pieces of historic code;
- storing, by the processor, the plurality of atomic pieces of historic feedback and the plurality of atomic pieces of historic code to a data store;
- receiving, by the processor, a request for code review of new code;
- comparing, by the processor, the new code to the plurality of atomic pieces of historic code to measure similarities between the new code and the plurality of atomic pieces of historic code to identify each atomic piece of historic code that is similar to the new code, wherein each similar atomic piece of historic code are ranked according to similarity to the new code;

providing, by the processor, feedback on the new code based on atomic pieces of feedback associated with the similar atomic pieces of historic code and sorting the feedback based upon the ranked similarity and a priority of the feedback; and tracking actions of a developer learning from actions of the developer, and increasing or decreasing the priority of the feedback associated with the similar code for being considered in the future based on an action of the developer, wherein the priority of the feedback is increased when the action of the developer is to address an issue in a similar way as it was previously addressed, and wherein the priority of the feedback is decreased when the action of the developer is not to address the issue.

14. The computer program product of claim 13, wherein comparing the plurality of atomic pieces of historic feedback to group similar kinds of feedback further comprises using a natural language processing (NLP) technique to compare the plurality of atomic pieces of historic feedback to group similar kinds of feedback.

15. The computer program product of claim 13, wherein providing the feedback on the new code further comprises sorting the feedback on the new code based on a distance between the code and a relevance of the feedback stored in the data store.

16. The computer program product of claim 13, wherein the feedback on the new code instructs a developer how to improve the code based on previous feedback for similar code.

17. The computer program product of claim 13, the method further comprising:

receiving, by the processor, a second request for code review of second new code;

comparing, by the processor, the second new code to the plurality of atomic pieces of historic code to measure similarities between the new code and the plurality of pieces of historic code to identify similar code from the plurality of atomic pieces of historic code; and providing, by the processor, feedback on the second new code based on feedback associated with the similar code.

* * * * *